UNITED STATES PATENT OFFICE.

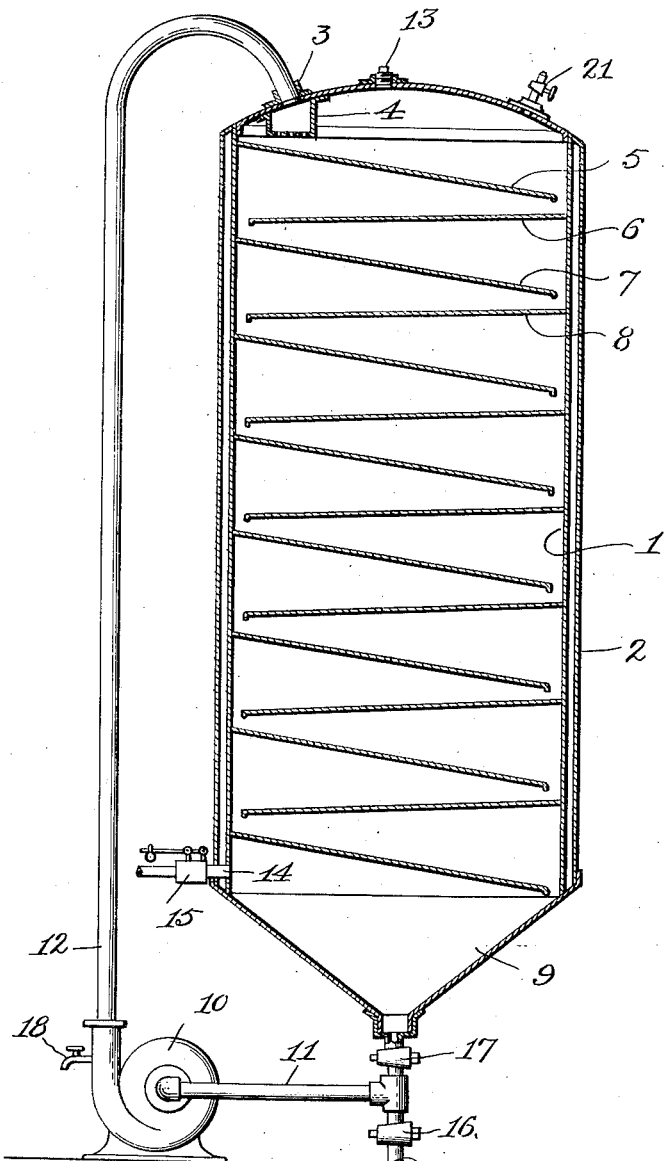

JEROME N. HUMPHREYS, OF DALLAS, TEXAS.

HYDROGENATING OILS, FATS, AND FATTY ACIDS, &c.

1,100,735.            Specification of Letters Patent.      Patented June 23, 1914.

Application filed February 26, 1913. Serial No. 751,327.

*To all whom it may concern:*

Be it known that I, JEROME N. HUMPHREYS, a citizen of the United States, and resident of Dallas, in the county of Dallas and State of Texas, have invented certain new and useful Improvements in Hydrogenating Oils, Fats, and Fatty Acids, &c.; and I do hereby declare the following to be a full, clear, and exact description of the same, reference being had to the accompanying drawing, forming part of this specification, and to the figures and letters of reference marked thereon.

This invention relates to the saturating of fatty acids and their glycerids and other esters, etc., with hydrogen in the presence of finely divided catalytic agents, the reaction following along well known lines as developed by Sabatier and Senderens, Paal, Roth, Ratkitin, Impatiew, Norman, Crosfield, Kayser and others. The said investigators in this art, have proposed various methods of handling the oils, etc., and exposing the same to the action of hydrogen, as, for example, it has been proposed to spray the oil from a nozzle into an atmosphere of hydrogen, to bubble the hydrogen through a pool of the oil, to propel the oil and catalytic material into an atmosphere of hydrogen by mechanical agitators, and to repeatedly pass the oil through and over, or in contact with a static catalytic agent, usually a catalyzing metal held by a more or less porous carrier or a carrier having numerous passages therethrough, for the body to be hydrogenated and the hydrogen gas by which saturation is effected. It has also been proposed to pass the hydrogen rapidly in or through the medium to be hydrogenated, and usually carrying comminuted catalyzing agents, with the idea that such rapid movement facilitated absorption. My own investigations lead me, however, to the conclusion that the rapidity of the gas movement, excepting only to increase the amount of surface exposed, bears no relation to the absorption nor to the rate of absorption, that is to say, the absorption is neither retarded nor accelerated save for the increase in the area of surface exposed.

The objects of my present invention are to improve upon the methods heretofore proposed and practised, and to provide a more rapid process by exposing the oil, etc., carrying in suspension a finely divided catalytic body more effectually to the action of the hydrogen gas, and in such manner as to avoid difficulties heretofore encountered in the handling of the gas and oil, etc., to effectuate the absorption process.

Generally speaking, the invention contemplates the employment of a body of hydrogen maintained under a reasonable pressure and the exposure in said body of hydrogen of thin unbroken flowing films of oils, etc., carrying in suspension finely divided catalyzing agents, the films of oil being maintained as thin as practicable without destroying their character as films or their capacity to flow in unbroken strata, to which ends, oil, etc., having in suspension therein the finely divided catalyzing agent, is caused to flow over plane, slightly inclined, supporting surfaces in the hydrogen atmosphere aforesaid, and in the practical development of the invention it is caused to repeatedly flow over such supporting surfaces whereby any desired degree of saturation may be effected, the whole operation being conducted at a temperature sufficiently high to insure the maintenance of the material being acted on in a sufficiently fluid condition to flow by gravity over the supporting surfaces in the thin unbroken films referred to.

Competent apparatus for carrying the present invention into practice embodies a closed chamber having within it plane, slightly inclined, supporting plates, one above the other, and successively discharging at their lower edges onto the upper portions of the next succeeding plate with means at the bottom of the chamber for collecting the material being acted upon and delivering the same to a suitable pump or other means whereby it may be conveyed back to the top of the chamber to thereby complete the path of circulation, also means for heating the chamber, means for the introduction of hydrogen into the same, and for the introduction of fresh supplies of catalyzing material and oil, etc., to be saturated.

The accompanying drawing is a sectional elevation somewhat diagrammatic in character, of an apparatus competent for carrying the present invention into practice, and in said drawing reference numeral 1 indicates a cylindrical tank or chamber having a conical bottom 9 and preferably having an upwardly dished top. The chamber or tank is surrounded by a heating jacket 2 which may be adapted for the circulation of steam or other heating medium in the well known way. Within the chamber and ranging from top to bottom are a series of plane slightly inclined plates 5, 6, 7, etc., the upper plates, each at their lower edges, discharging onto the upper portions of the lower plates and proximate plates being inclined in opposite directions, the angle of inclination being such as is best calculated to cause a steady uniform and unbroken film of the material to be saturated, to flow down over the upper surfaces of the succeeding plates and the spaces at the discharge edges of the plates affording ample communicating passage ways to insure the uniform distribution of the atmosphere within the tank, or chamber. The pipe connection 20 at the bottom of the tank is provided with valves or gates 16 and 17, and a pipe 11 communicates with the pipe 20 between said valves or gates. Pipe 11 leads to a circulating pump 10 having its discharge through a pipe 12 extending up to the top of the tank or chamber and entering the same through a nipple or coupling 3. Within the tank or chamber and receiving the discharge from the circulating pump is a distributing trough 4, preferably having a perforated bottom so as to give a uniform distribution over the upper portions of the topmost baffle plate. A hydrogen inlet 14 is provided and the hydrogen is admitted, preferably through a regulating valve 15, whereby the pressure in the hydrogenizing chamber may be maintained with uniformity to secure the best results. In practice about four atmospheres of pressure has been found most suitable, all conditions being taken into consideration.

In addition to the connections described, the chamber is also preferably provided at the top with a suitable admission opening 13 for the catalyzing agent and a blow-off cock 21 through which the gases coming from the chamber may be discharged when the chamber is initially filled with hydrogen, while the circulating system or the pipe communicating with the bottom of the chamber is provided with a test cock 18 through which samples of the saturated materials may be withdrawn for determining when the saturation has progressed to the desired degree.

Briefly, with an apparatus such as described, the process is carried out as follows: The pipe 20, being in communication with a supply of oil or other material which it is desired to hydrogenate, the valve 16 is opened and a sufficient quantity of the material is pumped into the circulating system and to fill the conical bottom to a point where the outlet will be covered. The proper amount may be determined by previous measurement, if so desired. The valve 16 is then closed and valve 17 opened, whereupon the circulation of the material through the pump to the top of the chamber, thence in thin supported films to the bottom of the chamber and back to the pump. Sufficient hydrogen is admitted to flush out all other gases and the catalyzer is then introduced through the opening 13 above the upper baffle plate and which catalyzer, it is obvious, will become thoroughly mixed and intermingled with the liquid. The contents of the tank are kept at the proper temperature, usually about 300° F. and the supply of hydrogen being constant and under a reasonable pressure in the chamber, absorption rapidly ensues due to the larger surface of the catalytic carrying material exposed and its rapid charge of surface accomplished by its flowing over its supporting surface, whereby fresh molecules are successively brought together at each portion of the movement.

The operation is maintained and hydrogen is admitted until the desired degree of absorption is attained, which result may be determined from samples drawn from time to time through the test cock 18, the degree of absorption being indicated by the iodin number or titre of the fatty acid of the material being hydrogenated.

It will be noted that by exposing thin unbroken supported films or streams of the material to be hydrogenized carrying in suspension the catalytic agent, a much larger proportion of the molecules of the material may be exposed to the hydrogen, and for longer periods of time within a given area than in any other way, and the efficacy of the invention is thought to be largely due to this fact, although, by causing the material to flow over supporting surfaces there is a constant interchange and intercommingling throughout all of the surface areas whereby fresh molecules are brought into contact with each other and into contact with the pervading hydrogen atmosphere, and to this action there may be attributed an efficiency not otherwise obtained.

While a cylindrical tank or chamber has been referred to herein, it is obvious that the particular shape of the chamber employed is not important or essential to the invention, and hence I do not wish to be limited to any particular form or dimension.

Having thus described my invention what I claim as new and desire to secure by Letters Patent of the United States, is:

1. A process of hydrogenating unsaturated fatty material, which consists in causing a mixture of the unsaturated fatty material and a divided catalytic agent to move in a film relatively slowly and quietly in a circuitous path in contact with a stationary inactive substance, in an atmosphere containing hydrogen.

2. A process of hydrogenating unsaturated fatty material which consists in causing a mixture of the unsaturated fatty material and a pulverulent catalytic agent in a film to flow quietly solely by gravitation in a circuitous path over a baffle element formed of some inactive substance, in the presence of hydrogen.

3. A process of hydrogenating unsaturated fatty material, which consists in causing a mixture of the unsaturated fatty material and a finely divided catalytic agent in a film to flow quietly in a circuitous path repeatedly over and in contact with a smooth baffle element formed of some inactive substance, in an atmosphere containing hydrogen.

4. A process of hydrogenating unsaturated fatty material which consists in causing a mixture of the unsaturated fatty material and a divided catalytic agent to gravitate over inactive material of a relatively large area for prolonging the time of the travel of said mixture over and in contact with the inactive material, in the presence of hydrogen.

5. A process of hydrogenating unsaturated fatty material, which consists in causing a mixture of the same and a divided catalytic agent to flow without violent agitation over inactive material of a relatively large area, in the presence of an atmosphere containing hydrogen.

6. A process of hydrogenating unsaturated fatty material, which consists in causing a mixture of the unsaturated fatty material and a divided catalytic agent, in the form of a film, to flow over inactive material, in the presence of an atmosphere containing hydrogen.

7. A process of hydrogenating unsaturated fatty material, which consists in causing a mixture of the unsaturated fatty material and a divided catalytic agent, in the form of a film, to flow by gravity over inactive material without violent agitation, in an atmosphere containing hydrogen.

8. A process of hydrogenating unsaturated fatty material, which consists in causing a mixture of the unsaturated material and a finely divided catalytic agent in the form of a film to move slowly and quietly without violent agitation, solely by gravitation, over and in contact with a stationary baffle element of considerable area whereby the length of time consumed in the travel of the film over the baffle element is prolonged in the presence of an atmosphere of hydrogen.

9. The process of hydrogenating oils, fats, fatty acids, etc., containing unsaturated constituents and carrying in suspension a finely divided catalyzing agent, which consists in exposing thin supported and flowing films of the material to gaseous hydrogen in a heated chamber.

10. A process of hydrogenating oils, fats, fatty acids, etc., containing unsaturated constituents and carrying in suspension a finely divided catalyzing agent, which consists in exposing a thin supported and unbroken flowing film to gaseous hydrogen in a heated chamber, and in causing said material to circulate repeatedly over its film supporting surface.

11. A process of hydrogenating oils, fats, fatty acids, etc., having in suspension therein a finely divided catalyzing agent, which consists in circulating a thin supported flowing film of the same within a heated chamber containing gaseous hydrogen under pressure.

12. The process of hydrogenating oils, fats, fatty acids, etc., containing unsaturated constituents, which consists in exposing the material in a series of succeeding thin supported unbroken flowing films to the action of gaseous hydrogen while subjected to heat and pressure and in commingling with the material to be hydrogenated a comminuted catalyzing agent.

13. The process of hydrogenating oils, fats, fatty acids, etc., containing unsaturated constituents and carrying in suspension a finely divided catalyzing agent which consists in flowing said material by gravity over plane, inclined, supporting surfaces arranged in succession and exposed to an atmosphere of gaseous hydrogen and heat and in circulating the material discharged from the lowermost support back to and depositing the same upon the uppermost support.

JEROME N. HUMPHREYS.

Witnesses:
 FRED G. TONGUE,
 E. H. KIRK.